Patented Jan. 13, 1925.

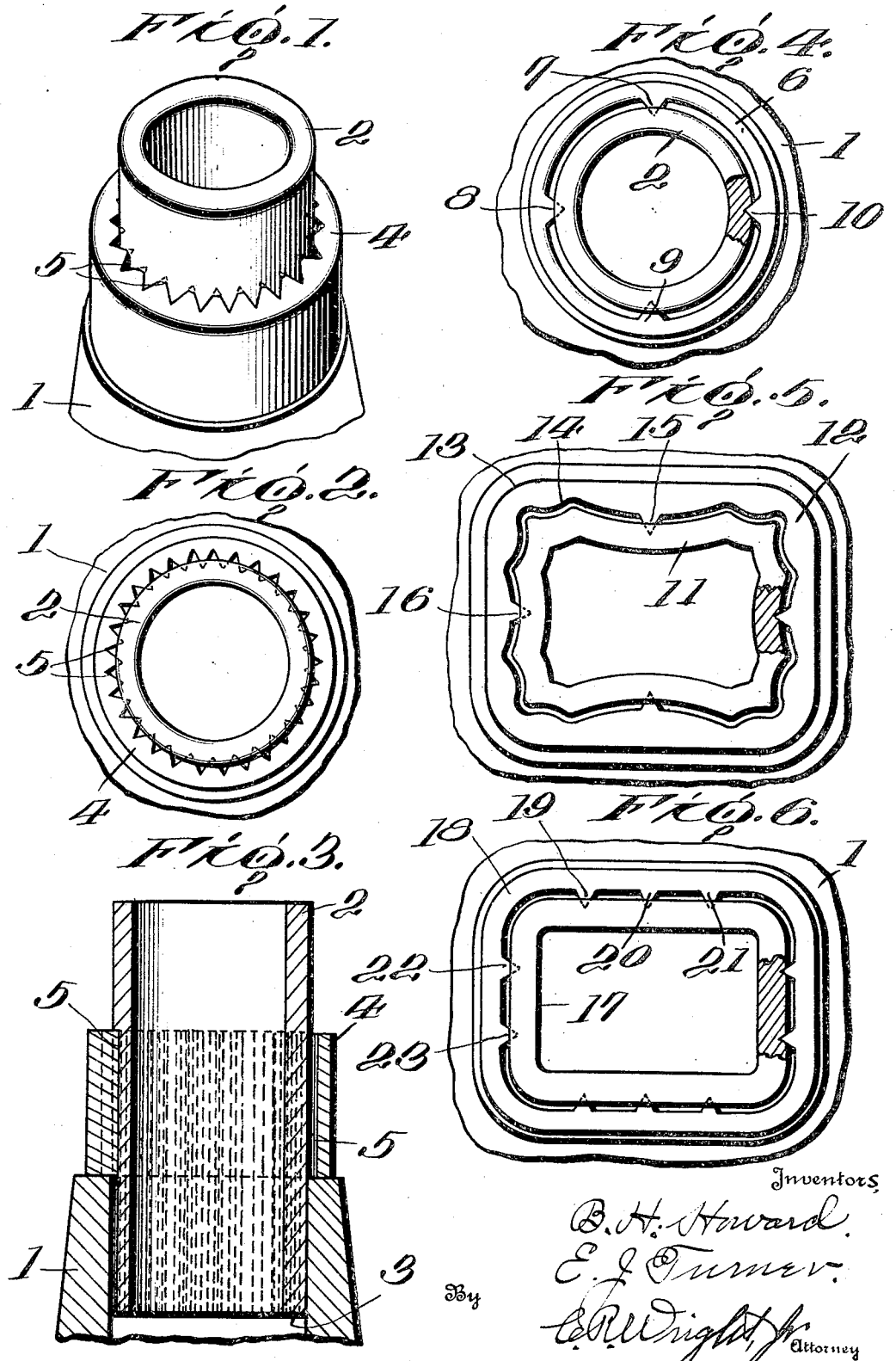

1,523,202

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed November 1, 1924. Serial No. 747,324.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds used in the manufacture of iron or steel ingots, and the object of the same is to prevent holes and seams in the upper end of the ingot as "piping" and at the same time produce a feeder which reduces segregation.

The object of our invention is to provide a feeder made of refractory material and having a metal band held thereon above the mold so as to strengthen the refractory feeder and also said band providing means whereby the feeder is supported within the upper end of the mold.

Another object of our invention is to provide a reversible feeder in which either end of the feeder can be placed in the mold, provide means whereby the band is tightly held upon the refractory feeder, and at the same time provide means whereby the band can be used over and over again.

A further object of our invention is to provide a simple, cheap and effective feeder of this character having certain details of structure and combination of parts hereinafter more fully set forth.

In the accompanying drawings:

Figure 1 is a perspective view of a mold showing our improved feeder applied thereto.

Figure 2 is a top plan view of Figure 1.

Figure 3 is a transverse vertical sectional view of Figure 1.

Figure 4 is a top plan view partly broken away of a modified form of feeder showing a circular mold and circular feeder.

Figure 5 is a top plan view of a fluted feeder applied to a correspondingly shaped mold.

Figure 6 is a top plan view of our improved feeder applied to a rectangular mold.

Referring now to the drawings, 1 represents the ingot mold and 2 the feeder which as shown is of a cylindrical form having perfectly plain inner and outer walls. The exterior diameter of the feeder is of a diameter equal to, or slightly less than the interior bore 3 of the mold 1, whereby the feeder is readily inserted into the bore of the mold. Our improved strengthening band consists of a cylindrical body portion 4 having a plain outer wall and having its inner diameter provided with vertically extending teeth 5 which are adapted to cut into the outer face of the feeder 2 as it is driven thereon and tightly held on the feeder 2 as shown in Figures 1 and 3 of the drawings. The band 4 can be driven on any desired distance whereby the feeder can be made to extend a greater or less distance into the bore of the mold.

In the modification shown in Figure 4, we have shown the mold 1 of the same form as that shown in Figures 1, 2 and 3 and the feeder 2 is made precisely like that shown in Figures 1, 2 and 3. The band 6 however is provided with only four inwardly extending vertically arranged biting ribs 7, 8, 9 and 10.

In Figure 5 of the drawings we have shown the fluted mold and a correspondingly shaped feeder 11. The band 12 in this form has its outer wall 13 approximately rectangular and its inner wall fluted as indicated at 14 to correspond with the flutes of the feeder 11. Each side wall of the band is provided with a vertically disposed biting rib 15 and each end wall is provided with a biting rib 16.

In the form shown in Figure 6, the mold 1 is of a rectangular form and the feeder 17 of a corresponding form and the band 18 is of the same form. The side walls of the band 18 are each provided with three vertically disposed biting ribs 19, 20 and 21, and the ends of the band 18 are each provided with two vertically disposed ribs 22 and 23.

While we have shown and described biting ribs as extending longitudinally, it is understood that they could be made in form of rows of lugs or points arranged in a longitudinal line.

Having thus fully described our invention what we claim is:—

1. A feeder for ingot molds comprising a body portion of refractory material, and a metal band having teeth on its inner face for locking the same on the exterior of the refractory body portion.

2. A feeder for ingot molds comprising a body portion of refractory material, and a metal supporting and strengthening band around the same, and having means on its inner face for engaging the body portion and holding it thereon.

3. A feeder for ingot molds comprising a body portion of refractory material, and a metal supporting and strengthening band having means on its inner face for biting into the refractory body portion for holding it thereon.

4. A feeder for ingot molds comprising a body portion of refractory material, and a metal supporting and strengthening band having longitudinally extending teeth on its inner face for locking the same on the exterior of the refractory body portion.

5. A feeder for ingot molds comprising a body portion of refractory material, and a metal band having serrations on its inner face for biting into the exterior wall of the refractory body portion and holding it thereon.

6. A feeder for ingot molds comprising a body portion of refractory material, and a strengthening band for suspending the lower part of the body portion in the ingot mold.

In testimony whereof we affix our signatures.

BLOOMFIELD H. HOWARD.
ERNEST J. TURNER.